(12) United States Patent
Tabi

(10) Patent No.: US 7,546,630 B2
(45) Date of Patent: Jun. 9, 2009

(54) METHODS, SYSTEMS, AND MEDIA TO AUTHENTICATE A USER

(75) Inventor: Timur Tabi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 10/621,952

(22) Filed: Jul. 17, 2003

(65) Prior Publication Data

US 2005/0015601 A1    Jan. 20, 2005

(51) Int. Cl.
G06F 7/04 (2006.01)
G06F 17/30 (2006.01)
G06K 9/00 (2006.01)
H04L 9/32 (2006.01)

(52) U.S. Cl. .......................................................... 726/2
(58) Field of Classification Search ....................... 726/2
See application file for complete search history.

(56) References Cited

U.S. PATENT DOCUMENTS

| | | | | |
|---|---|---|---|---|
| 6,154,528 A * | 11/2000 | Bennett et al. | ............. | 379/93.25 |
| 6,625,643 B1 * | 9/2003 | Colby et al. | ................. | 709/217 |
| 2001/0047477 A1 * | 11/2001 | Chiang | ......................... | 713/170 |
| 2004/0068572 A1 * | 4/2004 | Wu | .............................. | 709/229 |
| 2004/0107282 A1 * | 6/2004 | Chakraborty et al. | ........ | 709/229 |
| 2004/0156378 A1 * | 8/2004 | Walls et al. | .................. | 370/412 |

OTHER PUBLICATIONS

Laurent, Simon St. Cookies. McGraw-Hill: New York, NY. 1998. pp. 2 and 22.*

* cited by examiner

*Primary Examiner*—Kambiz Zand
*Assistant Examiner*—Jason K Gee
(74) *Attorney, Agent, or Firm*—Diana Roberts Gerhardt; Schubert Osterrieder & Nickelson PLLC (57) ABSTRACT

Methods, systems, and media to authenticate a user for interaction with applications on a server are disclosed. Embodiments include hardware in and/or software on a server adapted to generate a unique, session identification like a random number to identify a user's login session. The identification is stored in memory that will not be de-allocated upon termination of applications on the server and is transmitted via, e.g., a cookie to the user's browser, or the like. Subsequent user accesses can be verified by comparing the session identification from the web browser with the corresponding entry in the memory. Once the user's identification is verified, the user is authorized to access to applications associated with the user's login session, providing independence from the architecture of the applications executed by the server. Further embodiments include additional session information with the identification in the memory. Some embodiments monitor login sessions for expiration.

22 Claims, 4 Drawing Sheets

FIG. 1

METHODS, SYSTEMS, AND MEDIA TO AUTHENTICATE A USER

FIELD OF INVENTION

The present invention is in the field of user authentication. More particularly, the present invention relates to methods, systems, and media to authenticate a user for interaction with applications on a server without requiring the user to repeatedly provide login information like a user name and password.

BACKGROUND

The Internet has seen explosive growth primarily fueled by the introduction and widespread use of web browsers that enable access to networked servers via a simple, graphical, user interface (GUI). Web browsers support hypertext documents, often referred to as web pages, such as hypertext markup language (HTML) and allow a user to load these documents remotely from a server via local area networks (LANs) and wide area networks (WANs).

Servers like the IBM eServer i-Series and p-Series include a web server application to execute web applications like common gateway interface (CGI) applications in response to requests by a user. More specifically, the web server interacts with the user's web browser to facilitate communication between the server and the user using a hypertext transport protocol (HTTP). The web server passes data between the browser and web applications of the server and finds, loads, and unloads web applications in response to communications from the user via the browser.

HTTP, however, is a stateless protocol so each request from an HTTP client to an HTTP server is considered a new request and no state is maintained between the requests. Since the most common interactions between a user and a server require multiple, related requests, the server creates a session to track the related requests so the server can react properly to a user's communication. HTTP cookies and/or uniform resource locators (URLs) typically facilitate tracking of the state of the session on the user's side. Cookies are created by a web application and include data such as a range of URLs for which the cookie is valid. The cookie is then stored on a user's computer via the web browser and returned to the server when the browser encounters the same URLs. URLs can be used in a similar manner by incorporating session data in a URL so a parsing routine can find the session data.

A session management application on the server typically remains resident in memory, monitoring interactions between a user and the web applications to track the activities of a user via the cookies or URLs. For example, a user may cause a CGI to be executed on the server to perform a product search in a database of an on-line store. When the user causes another CGI to execute to add the results of the product search to a "shopping cart", the session management application creates a session to track items added to the shopping cart.

When the user decides to check out, the session management application creates a secure session, or login session, to track sensitive information like payment, billing, and shipping information. In particular, by pressing a "checkout" button, the user implements a login CGI that authenticates the user's identity by verifying, e.g., the user's name and password. The session management application must then remember the sensitive information provided by the user to facilitate the checkout process and to avoid the security risks inherent to passing the sensitive information back and forth between the server and web browser via cookies or URLs.

Current solutions for remembering the login session involve maintaining the session management application resident in memory and storing the sensitive information in memory allocated for the session management application. The session management application can then pass the sensitive information to other applications as necessary to implement the checkout process. Other solutions conserve memory resources in the server by storing the sensitive information in a database application, e.g., on a hard drive. The session management application creates a session identification and transmits a cookie with the session identification to the user for identifying the login session. When the user accesses a web application related to the login session, the cookie is transmitted to the session management application, and the session management application accesses the database application via an application program interface (API) to verify the user's login information.

The adaptability associated with such web application architecture has inspired the design of embedded applications for many current servers. In particular, servers such as IBM eServer i-Series and p-Series offer access to system management and configuration applications, referred to as service processor menus, via web browsers. Thus, a user such as an administrator, customer, and/or customer engineer can implement major configuration and system setting changes like managing the boot and shutdown sequences for the server by directing communications to a URL for the embedded system via a web browser.

Similar to the access of login sessions via web applications, embedded systems may require the user to login and privilege levels associated with the user's login facilitate access to various applications, e.g., service processor menus or functions of the service processor menus. For instance, the customer engineer may have the highest level of access since the function of the customer engineer is typically to identify and repair problems associated with the server. The administrator and customer may have lower privilege levels to provide access to system settings and configurations associated with authorizing and managing users, and customizing the server's functionality for the customer.

Unlike access to login sessions via web applications, embedded systems do not typically anticipate thousands or hundreds of thousands of concurrent users. Embedded systems may anticipate up to, e.g., a dozen concurrent users, and have relatively limited resources to track user login sessions. Since maintaining the web server, session management application as well as login and session information resident in memory consumes a significant amount of the limited resources available to embedded systems, current solutions are impractical.

The other solutions that involve maintaining the web server, session management application and session identity resident in memory while storing the sensitive information and session state information within a database application, are slow as well as impractical. In particular, the session management application must interface with an API for the database application through bridges, secondary busses, and input-output (I/O) drivers to access the sensitive information, compounding the latency involved with each communication that requires user authentication. Further, when considering that only a dozen users may be accessing login sessions concurrently, the use of a database application to store sensitive information is a significant waste of server resources.

SUMMARY OF THE INVENTION

The problems identified above are in large part addressed by methods, systems, and media to authenticate a user for interaction with applications on a server. One embodiment provides a method for logging a successful authentication of a user. The method generally includes generating a session identification in response to the authentication to identify a login session for the user; storing the session identification in a memory location, the memory location being configured to retain the session identification independent of de-allocations of memory for individual applications, to authenticate the user for at least one of the independent applications; transmitting the session identification to the user; and authenticating the user for the at least one of the independent applications in response to receipt of the session identification upon verifying that the session identification is stored in the memory location.

Another embodiment provides an apparatus for logging a successful authentication of a user for a server. The apparatus contemplates a memory location to retain a session identification independent of de-allocation of memory for individual applications executed on the server; a session creator coupled with the memory location to generate the session identification in response to the authentication to identify a login session of the user, store the session identification in the memory location, and transmit the session identification to the user; and a session authenticator coupled with the memory location to authenticate the user for an application of the individual applications executed on the server in response to receipt of the session identification upon verifying that the session identification is stored in the memory location.

A further embodiment provides a machine-accessible medium containing instructions, which when executed by a machine, cause said machine to perform operations. The operations can involve generating a session identification in response to a user authentication via a login application to identify a login session for a user; storing the session identification in a memory location, the allocation for the memory location being independent of allocations of memory to individual applications, to authenticate the user for at least one of the individual applications; transmitting the session identification to the user; and authenticating the user for the at least one of the individual applications in response to receipt of the session identification upon verifying that the session identification is stored in the memory location.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media to authenticate a user for interaction with applications in an embedded system of a server are contemplated. Embodiments include hardware and/or software of the embedded system adapted to generate a unique, session identification (ID) like a random number to identify a user and the user's login session. The unique, session ID is stored in a memory location, such as a shared memory buffer, that will not be de-allocated upon termination of applications in the embedded system and is included in a cookie or the like and forwarded to the user's browser or the like so that each time the user executes an application, the user's identification can be verified by locating the corresponding entry in the memory location. Once the user's identification is verified, the user is authorized to access applications associated with the user's secure login session. Such embodiments are thus independent of the architecture of the applications executed by the embedded system. Further embodiments include additional session information with the session ID in the memory location like the user's privilege level, Internet Protocol (IP) address, time stamp, and etc. Some of these embodiments monitor the time stamps or time indications associated with a session ID or logout requests by the user to remove the session ID from the memory location, invalidating accesses with that session ID.

Figure 1:
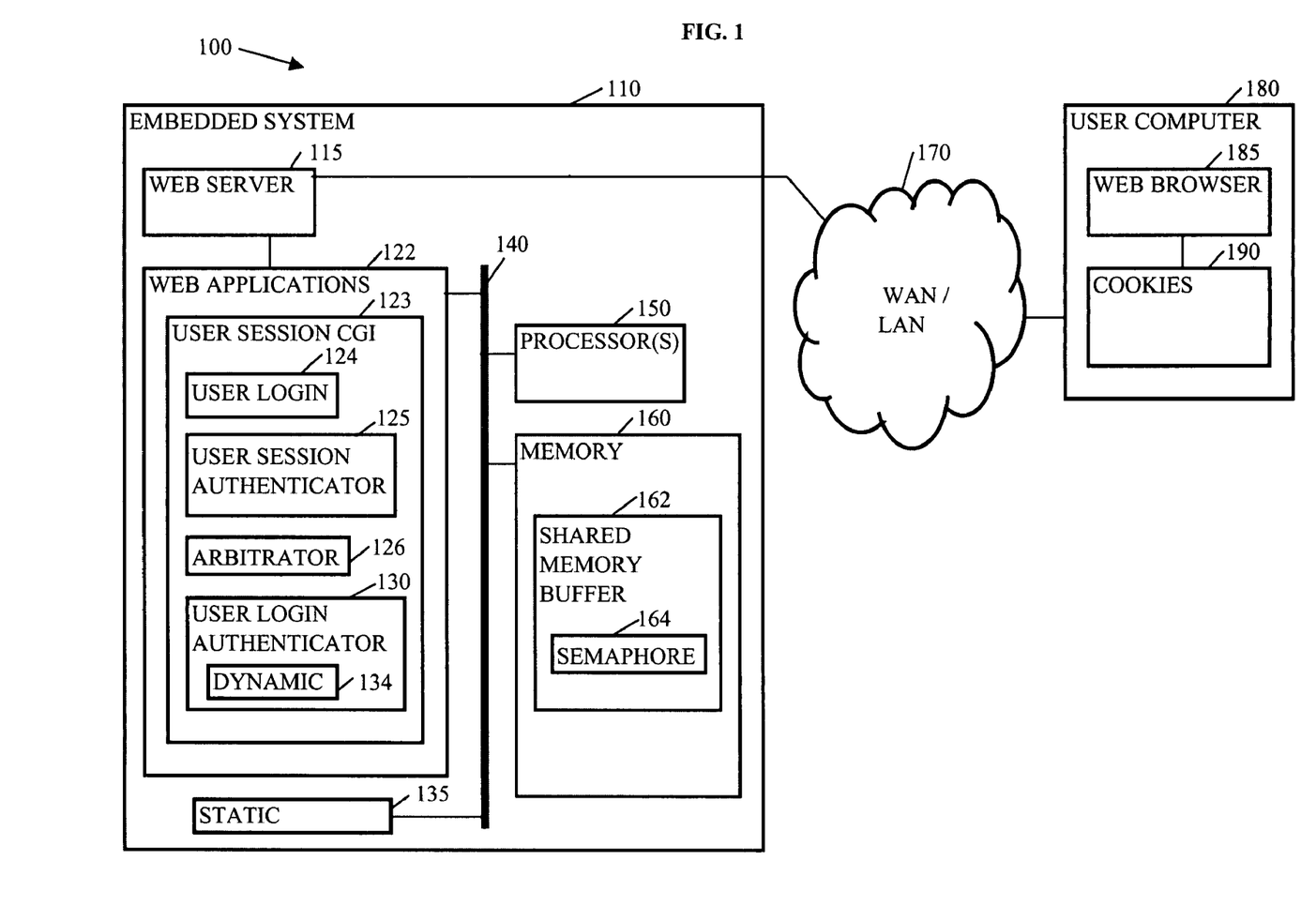
FIG. 1 depicts an embodiment of a system including an embedded system and user computer coupled via a LAN and/or WAN to authenticate a user for interaction with applications in the embedded system.

Turning now to the drawings, FIG. 1 depicts an embodiment of a system 100 to authenticate a user. More specifically, system 100 may facilitate a secure login session to an embedded system 110 for a user of a computer like user computer 180 via a wide area network or local area network like WAN/LAN 170. In many embodiments, embedded system 110 may include one or more processors, or threads of processors, executing code like CGIs and/or one or more state machines coupled with data storage devices like random access memory (RAM), and files on a hard drive. Upon booting, embedded system 110 may execute a web server 115 to facilitate interaction between a user and web applications 122 like service processor menus to support configuration of and system settings associated with embedded system 110. Further, when a shared memory buffer, or an application independent area of memory, has not been established, web server 115 may establish a shared memory buffer like shared memory buffer 162 so that data stored by a CGI like a CGI of web applications 122 can be accessed after the CGI unloads or terminates. In other embodiments, the first CGI called by web server 115 may establish a shared memory buffer like shared memory buffer 162. In further embodiments, the first CGI that attempts to access a shared memory buffer creates a shared memory buffer like shared memory buffer 162. In still further embodiments, an application that may run prior to executing web server 115 may create a shared memory buffer like shared memory buffer 162.

Embedded system 110 may be designed to provide a graphical user interface (GUI) for a user via the user's browser so the user can maintain configurations and settings for boot and shutdown sequences, modify the availability of a processor of processors 150 and memory 160, update firmware, set passwords, perform diagnostics, and maintain an error log. In the present embodiment, embedded system 110 comprises web server 115, web applications 122, a static 135, a bus 140, processor(s) 150, and memory 160.

Web server 115 may load and execute a. process like a CGI in response to user communication and pass data from the user to the process. When the CGI completes the task, the resulting data is passed back to web server 115. Then, web server 115 unloads the CGI and passes the resulting data to the user. For instance, upon receiving a request to enter a configuration menu, web server 115 receives a cookie from the user's browser like web browser 185. Web server 115 locates user session CGI 123, loads user session CGI 123 into memory 160, and executes the CGI. Upon authenticating the user, web server 115 unloads user session CGI 123, loads the CGI for the configuration menu from web applications 122 into memory 160, and executes the configuration menu CGI. Upon completion of the configuration menu CGI, web server 115 unloads the configuration CGI and data output from the configuration menu CGI is passed to the user via the user's web browser 185. In one embodiment, web server 115 may also be unloaded from memory like memory 160 until a communication is received from the user and while a CGI like the configuration menu CGI is being executed.

Web applications 122 may include firmware applications or CGIs such as a service processor setup menu to allow a user to set passwords and update machine firmware, a system power control menu to allow a user to control some aspects of how the machine powers on and the extent to which the boot sequence is completed, and a system information menu to provide the user with information about the boot sequence and errors, and a means of checking and altering the availability of processor(s) 150 and memory 160. In some embodiments, web applications 122 may be stored on a hard drive, in flash memory, in read only memory (ROM), or other non-volatile memory.

The privilege level associated with the user's login session may determine or limit the applications and/or functions of applications of web applications 122 that are available to the user to execute. For example, embedded system 110 may facilitate three types of users, an administrator, a customer, or a customer engineer and the applications and/or functions of applications of web applications 122 that are available to the user can depend upon the type of user associated with the user's login session. When the user logs in as an administrator, for instance, the user may be able to add/remove customer logins as well as limit the availability of different customer logins locally and/or remotely.

Web applications 122 may include a user session CGI 123 to facilitate authenticating a user for embedded system 110. More specifically, user session CGI 123 may include functions such as a user login 124, a user session authenticator 125, an arbitrator 126, and a user login authenticator 130. For example, the user executes web browser 185 on user computer 180 and enters the IP address to access embedded system 110. In response to the connection, web server 115 loads and executes user session CGI 123. User session CGI 123 may check for cookies received from the web browser 185. When no cookies are received, user session CGI 123 may initiate execution of user login 124. On the other hand, when a cookie is received, user session CGI 123 may initiate execution of user session authenticator 125.

User login 124 may facilitate display of a login window having prompts to obtain a name and a password from a user. Upon receiving the name and password, user login 124 may authenticate the name and password via user login authenticator 130. When the user login is verified, user session CGI 123 generates a session ID to identify the user and the user's login session. The session ID may be a random number such as a 64-bit or 128-bit random number that is unique with respect session ID's generated for other login sessions. User session CGI 123 then bundles the session ID into a packet or the like to store in a user database in shared memory buffer 162. User session CGI 123 also forwards the session ID to web browser 185 in the form of a cookie or the like such that the session ID can be returned to web server 115 when the user attempts to initiate another application of web applications 122.

In some embodiments, the additional session information is bundled or associated with the session ID and stored in shared memory buffer 162 such as the IP address of user computer 180, the user's privilege level, a time indication, and the like. In such embodiments, the additional session information may provide further verification of the user's identity.

User session authenticator 125 receives a session ID from the user and verifies that the session ID is a valid session ID, stored in shared memory buffer 162, to authenticate the user for access to embedded system 120. For example, after logging in to embedded system 110, the applications of web applications 122 that are associated with the user's login session may terminate. Then, the user may attempt to initiate another application of web applications 122. Web browser 185 returns the cookie having the session ID to web server 115. Then, once the session ID is located in shared memory buffer 162, the user is authenticated and the application that the user attempted to initiate is executed. In further embodiments, when the IP address for user computer 180 is stored with the session ID in shared memory buffer 162, user session authenticator 125 may search shared memory buffer 162 for the session ID. Upon locating the session ID, user session authenticator 146 may compare the IP address of user computer 180 with the IP address associated with the session ID in shared memory buffer 162 to confirm that these addresses are the same. When the IP addresses are the same, the user is authenticated. On the other hand, when, for instance, the user or another user attempts to forward a session ID from another IP address such as another computer, the authentication fails and the user is rejected or user login 124 is initiated to request that the user provide a name and password.

Arbitrator 126 arbitrates access to shared memory buffer 162, or a portion thereof, based upon an indication in semaphore 164. Before approving access to shared memory buffer 162 to compare a session ID with session IDs of authenticated users, arbitrator 126 checks semaphore 164 to determine whether another CGI is accessing the session IDs in shared memory buffer 162. When semaphore 164 indicates that no other CGI, such as another copy of user session CGI 123 loaded into memory 160, is accessing the session IDs in shared memory buffer 162, arbitrator 126 stores one or more bits in semaphore 164 to prevent the session IDs of shared memory buffer 162 from simultaneous access by another CGI. When semaphore 164 indicates that shared memory buffer 162 is being accessed, arbitrator 126 prevents simultaneous access by another CGI. For example, two users may be accessing embedded system 110. Each time one of the users communicates with embedded system 110, a copy of user session CGI 123 is loaded into memory 160 and executed to verify the user's identity. While the session ID for the first user in shared memory buffer 162 is being accessed by one copy of user session CGI 123, arbitrator 126 may lock the list of session IDs, referred to as a user database, in shared memory buffer 162 by storing an in-use indication in semaphore 164. When a second copy of user session CGI 123 attempts to access the user database, arbitrator 126 checks semaphore 142 to determine whether an application is currently accessing shared memory buffer 140, or a portion thereof. When arbitrator 126 determines that shared memory buffer 162 is being accessed, arbitrator 126 either places the request to access shared memory buffer 140 in a queue or rejects the request. In many embodiments, one copy of arbitrator 126 is loaded into memory 160 to arbitrate access to shared memory buffer 162 between multiple users.

In some embodiments, arbitrator 126 assigns and grants requests to access shared memory buffer 162 based upon one or more priorities associated with the privilege level of the user, the timing of the request with respect to other requests, a priority assigned to the user's login session, or the like. For instance, when a customer engineer is logged in to maintenance or repair web server 110, requests to access shared memory buffer 162 associated with the login session of the customer engineer may be given the highest priority, bypassing other requests that wait in a queue in their order of receipt. In other embodiments, arbitrator 126 may store high priority requests in a queue, servicing the requests in the queue and rejecting other requests until all the requests in the queue have been serviced. In further embodiments, arbitrator 126 may implement a round robin type arbitration scheme based upon the IP addresses of connected computers like user computer 180.

User login authenticator 130 may be a CGI that includes algorithms to verify a user login for embedded system 110. In particular, user login authenticator 130 may access a list of user names with corresponding passwords for customers and administrators in static 135. Static 135 may be stored in non-volatile memory such as flash memory, electrically erasable, programmable memory (EEPROM), RAM, or the like and may maintain user names and passwords. Dynamic 134, on the other hand, may be part of user login authenticator 130 and may include an algorithm that generates a unique password dependent upon, e.g., the date and/or time of the login, the serial number and the model number of the server including embedded system 110, or the like. For example, a customer engineer may have to contact a manufacturer of the server, such as IBM, with the serial number and model number of the server to determine the password for a specific day. IBM implements an algorithm like the algorithm of dynamic 134, to provide the customer engineer with the correct password so that the customer engineer's password can only authenticate the customer engineer on that day and/or time of day for access to embedded system 110. In some embodiments, user login authenticator 130 and/or static 135 may also include additional information such as privilege levels, login session restrictions, IP addresses from which the user may log into embedded system 110, an indication of a previous login session, and other data related to the login sessions by corresponding users.

Bus 140 may be one or more busses to facilitate communication between web server 115, web applications 122, processor(s) 150, and memory 160. In many embodiments, bus 140 may comprise a combination of parallel and point-to-point, unidirectional and bidirectional busses and bridges.

Processor(s) 150 may include one or more processors like the IBM POWER4 or POWER4+ processors. In some embodiments, processor(s) 150 include Multichip Module (MCM) packaging and/or Single Chip Module (SCM) packaging. The SCM packaging may be mounted on a processor card and may include one or more processor cores. In some embodiments, one processor is dedicated for execution of applications associated with embedded system 110. In other embodiments, one or more processors or threads of processor(s) 150 may execute instructions for applications associated with embedded system 110.

Memory 160 represents memory built into the server including embedded system 110 and is shown as a single element for convenience. Memory 160 may include random access memory (RAM) such as double data rate (DDR) synchronous dynamic RAM (SDRAM), caches, buffers, read only memory (ROM); flash memory, and/or remote data storage like magnetic disk storage media, optical storage media, and flash memory drives. In the present embodiment, memory 160 includes memory for allocation to applications of web applications 122 when executed by embedded system 110.

In the present embodiment, memory 160 also includes shared memory buffer 162. Shared memory buffer 162 may be memory, e.g. 4 kilobytes (KB), allocated for use by embedded system 110 independent of allocations to individual applications, to store a list of session IDs. Unlike memory allocated for an application like a CGI, the data stored in shared memory buffer 162 is not de-allocated when a particular application terminates or unloads. For example, user login 124 may execute when a user first logs into embedded system 110. The user enters a name and password in response to prompts from user login 124 and user login 124 stores the name and password in variables in memory 160. The name and password are then compared with names and passwords by user login authenticator 130 to determine whether the user is authorized to log into embedded system 110. When the user authorization is verified, a unique, session ID is generated and stored in shared memory buffer 162. Then, user login 124 terminates and the memory of memory 160 allocated to store the name and password is de-allocated and no longer accessible to applications. On the other hand, the session ID stored in shared memory buffer 162 remains accessible.

Shared memory buffer 162 may include semaphore 164. Semaphore 164 may provide a flag having one or more bits of data to indicate whether one or more session IDs in shared memory buffer 162 are being accessed and/or modified. In several embodiments, a flag indicates that a list of session IDs, the user database, in shared memory buffer 162 is being accessed. In further embodiments, a flag is set for each session ID stored in shared memory buffer 162 being accessed. Thus, session IDs other than the one being accessed or modified may be compared against a session ID received from web browser 185 to determine whether the session ID received is in the list of other session IDs. Then, when a flag in semaphore 164 is reset to indicate that the busy session ID is released and is no longer being accessed or modified, the session ID received from web browser 185 may be compared against the released session ID.

WAN/LAN 170 is a network connection to couple web server 110 with user computers such as user computer 180. In some embodiments, WAN/LAN 170 may include a network in an office coupled via Ethernet, optical media like OptiConnect, or the like. In some embodiments, WAN/LAN 170 also couples with the Internet via a cable modem, a direct subscriber line (DSL), a T1 line, a T3 line, or the like. In further embodiments, WAN/LAN 170 may include a network of temporary connections such as connections via a telephone system. In other embodiments, one or more user computers like user computer 180 may couple with embedded system 110 directly.

User computer 180 may include one or more computer systems such as personal computers, laptops, other servers, or the like, having hardware and software to communicate with embedded system 110 via WAN/LAN 170. In particular, user computer 180 may include web browser 185 and cookies 190. In other embodiments, user computer 180 may include applications that operate in a manner similar to web browser 185, such as a text interface application for a terminal, a PDA, or the like. Web browser 185 includes software adapted to provide a GUI that, in many embodiments, can be customized based upon a user's preferences with regards to command structures, text sizes, fonts, colors, sounds, languages, and etc. Web browser 185 accepts cookies like cookies 190 to store information related to a web site, or a session ID for embedded system 110 and returns the cookie to web server 115 when requesting that an application such as an application of web applications 122 be initiated. Web browser 185 may include Microsoft's Internet Explorer, AOL's Netscape Navigator, or the like.

Cookies 190 may include a session ID stored in temporary memory such as memory allocated for web browser 185 or a more permanent memory such as a file stored on a hard drive of user computer 180. After a user logs into embedded system 120, and the session ID is generated to identify the user and the login session, for example, the session ID may be transmitted to web browser 185 in the form of a cookie and stored in cookies 190.

Figure 2:
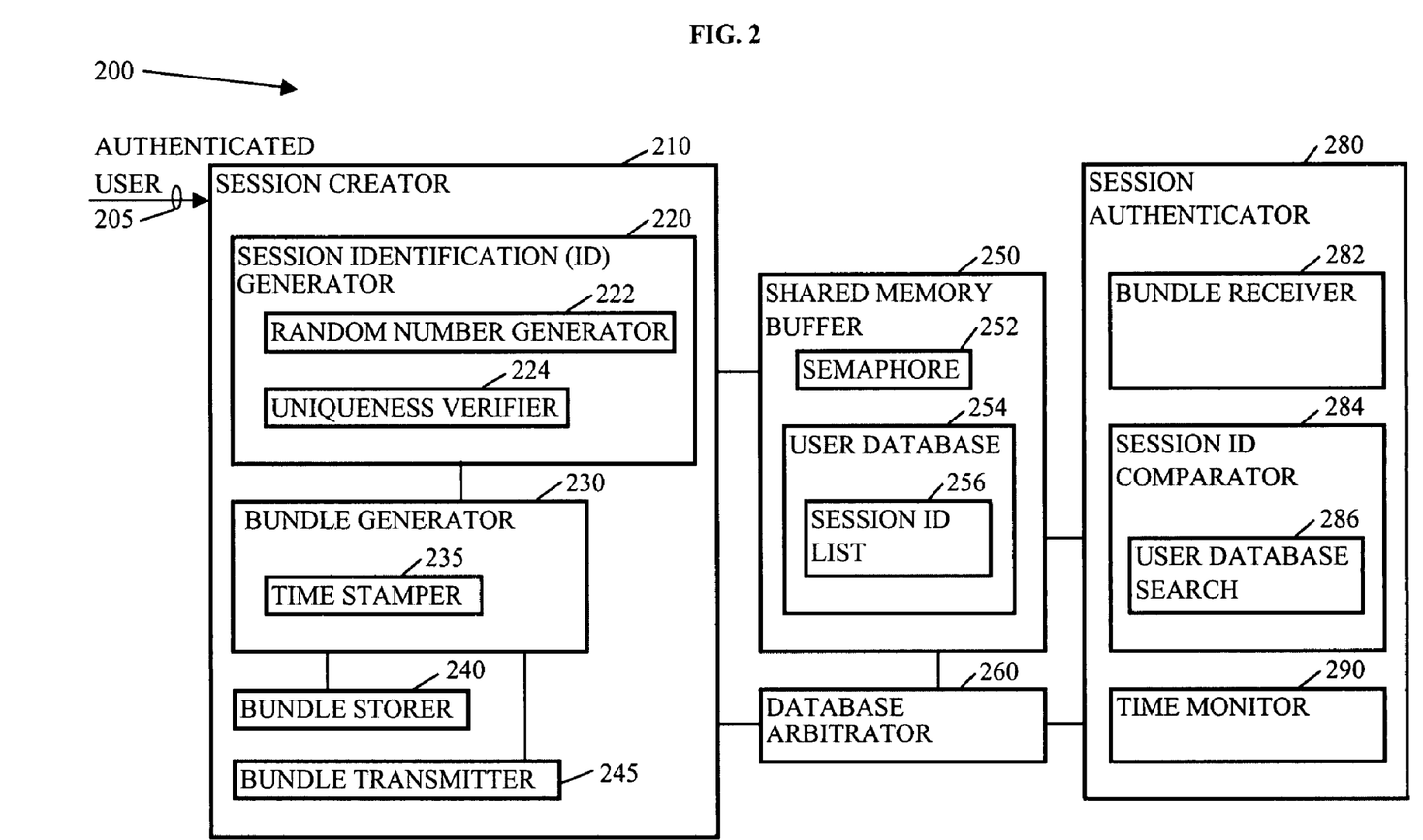
FIG. 2 depicts an embodiment of an apparatus including a session creator, session authenticator, arbitrator and a shared memory buffer to authenticate a user for interaction with applications.

Referring now to FIG. 2, there is shown an embodiment of an apparatus 200 to authenticate a user. Apparatus 200 may log a successful user authentication for a server. In particular, apparatus 200 may generate a session ID in response to an indication that the user's login has been authenticated 205 and store the session ID in a shared memory buffer 250 so the user can be subsequently authenticated without, e.g., requesting that the user re-enter a user name and password. Apparatus 200 includes a session creator 210, shared memory buffer 250, a database arbitrator 260, and a session authenticator 280.

Session creator 210 may couple with shared memory buffer 250 to generate a unique, session ID in response to user authentication 205 to identify a login session for a user, store the unique, session ID in a memory location, and transmit the unique, session ID to the user. For example, a user may initiate access to a system such as an embedded system associated with a service processor of the server to modify system configuration preferences. When the user is accessing the system for the first time, or when the user's previous login session has expired, the user is prompted to provide login information. Upon verifying that the user is authorized to access the system, a session creator 210 may be initiated to assign the user a unique session ID so user session authenticator 280 can authenticate the user without requesting the user to provide login information again.

Session creator 210 may include a session ID generator 220, a bundle generator 230, a bundle storer 240, and a bundle transmitter 245. Session ID generator 220 generates a unique, session ID in response to the user authentication 205 to identify a login session for a user. The unique, session ID may be unpredictable such that a user cannot guess the unique, session ID that will be created for that user or for any other user. In some embodiments, session ID generator 220 includes a random number generator 222 to generate a random number for the session ID to associate with the user and the login session. For instance, after a successful login, random number generator 222 may generate a 64-bit, random number. In several of these embodiments, session ID generator 220 may append or generate a session ID based upon, e.g., an indication of the date and time of the user's login and/or the user's IP address to ensure that the session ID is unique.

Session ID generator 220 includes a uniqueness verifier 224 to verify that the random number generated for the user has not been previously assigned. In particular, upon generating a random number for the session ID, uniqueness verifier 224 may couple with shared memory buffer 250 to compare the random number with session ID's previously assigned. When the random number is the same as a random number previously assigned as a session ID, random number generator may generate a different random number to assign to the user for the login session.

Bundle generator 230 may bundle the unique, session ID with additional session information, associating the additional session information with the user's login session. For example, bundle generator 230 may associate a session ID with session information such as the user's IP address, privilege level, location, Internet service provider, user name, and etc. In some embodiments, bundle generator 230 also includes a time stamper 235. Time stamper 235 may associate a time indication with the unique, session ID to facilitate expiring the unique, session ID after a selected time period. In many of these embodiments, the time period may be measured from the most recent user activity. For example, the session ID may expire if the user remains inactive for an hour. In further embodiments, the session ID may expire within 5 hours of the initial login for the corresponding login session.

Bundle storer 240 may store the session ID in a user database 254 of shared memory buffer 250. More specifically, bundle storer 240 may packetize the session ID and associated additional session information, and request access to shared memory buffer 250 from database arbitrator 260 to store the packet in an available entry of user database 254.

Bundle transmitter 245 may transmit a bundle having the unique session ID to a web browser. For instance, after a user logs into the server via a web browser, bundle transmitter may return a cookie with the session ID to the web browser. In some embodiments, the cookie also contains additional data such as an indication describing the expiration of the cookie such as five hours. In further embodiments, no expiration is included in the cookie and the browser assigns a default expiration.

Shared memory buffer 250 includes memory configured to retain the session ID independent of de-allocations of memory for individual applications and, thus, independent of the termination of applications executed on the server. In particular, shared memory buffer 250 may include one or more memory locations in a buffer, RAM, cache, and the like, that are not allocated to a specific application like a login application. For example, after the user logs into the server, the login application may terminate and no other applications may be running. Shared memory buffer 250, however, is not de-allocated upon unloading the login application or other applications associated with the server from memory so the session IDs in user database 254 remain available for subsequently initiated applications. In many embodiments, the contents of shared memory buffer 250 are lost when the server re-boots but in one embodiment, the session IDs of user database 254 remain available even after the server re-boots. In several embodiments, the session IDs of user database 254 remain available until they are removed.

Shared memory buffer includes semaphore 252 and user database 254. Semaphore 252 includes one or more flags to indicate when user database 254, and/or an entry thereof, is being accessed and/or modified. User database 254 includes a session ID) list 256 and, in several embodiments, additional session information associated with one or more session IDs in session ID list 256. Session ID list 256 may include session ID's associated with unexpired user login sessions. In further embodiments, session ID list 256 may retain a list of expired session ID's associated with an indication that the session ID's have expired. One embodiment employs a data encryption scheme for user database 254 like a public/private key data encryption scheme to allow authorized applications to access the session IDs while protecting the session IDs from unauthorized access.

Database arbitrator 260 may prevent simultaneous access of content of user database 254, or an entry therein, by more than one of the applications executed on the server. In many embodiments, database arbitrator 260 locks user database 254 when granting access to one application and removes the lock upon completion of the access. If a subsequent request to access user database 254 is made while user database 254 is locked, database arbitrator 260 denies that access. For example, bundle storer 240 generates a packet having a session ID to store in user database 254 and requests access to user database 254 via database arbitrator 260 to store the packet. When semaphore 252 indicates that user database 254 is in use, database arbitrator 260 may delay storage of the packet until semaphore 252 indicates that user database 254 is no longer being accessed. On the other hand, when semaphore 252 indicates that user database 254 is not being accessed, database arbitrator 260 stores an indication or sets a flag in semaphore 252 to indicate that user database is in use and grants access in response to the request to store the packet. In embodiments wherein separate indications in semaphore 252 describe whether entries of user database 254 are in use, database arbitrator 260 may prevent session authenticator 280 or other applications from accessing an entry that is in use, but bundle storer 240 may store packets in available entries without first requesting access via database arbitrator 260.

Session authenticator 280 may couple with shared memory buffer 250 to authenticate the user for an application of the applications executed on the server in response to receipt of the unique, session ID upon verifying that the unique, session ID is stored in shared memory buffer 250. In some embodiments, session authenticator 280 also verifies additional session information. For instance, after a user logs in and attempts to initiate a subsequent application associated with the login session, the web browser utilized by the user returns a cookie having a session ID. The IP address of the user may also be determined from the communication so after the session ID received from the web browser is determined to be stored in user database 254, the IP address of the communication from the web browser may be compared with the IP address associated with the session ID in user database 254. When the IP addresses are the same, the user is authenticated. On the other hand, when IP addresses are different, the user may not be authenticated.

Session authenticator 280 includes a bundle receiver 282, a session ID comparator 284, and a time monitor 290. Bundle receiver 282 may receive a cookie or the like from a user's web browser to authenticate the user and the user's login session. In particular, bundle receiver 282 may recognize a cookie attached to a communication such as a communication from the user requesting that a CGI for a system configuration menu be initiated, extract a session ID from the cookie, and initiate session ID comparator 284 to determine whether the session ID authenticates the user for a login session.

Session ID comparator 284 may compare the unique, session ID received from the user with session IDs previously stored user database 254. In some embodiments, when the number of session IDs is expected to be small such as a dozen or less, the unique, session ID is compared with session IDs in session ID list 256 in a linear manner, e.g., each session ID in session ID list 256 in order from the first to the last. In other embodiments, when the number of session IDs is expected to become large, e.g., hundreds, user database search 286 may be implemented to perform a binary search of the session IDs in session ID list 256. In such embodiments, the session IDs may be maintained in an order and the binary search may compare the session ID extracted from the cookie to a session ID substantially in the middle of session ID list 256. Then, depending upon whether the session ID extracted from the cookie is larger or smaller, compared to the middle of the remaining half of session IDs in session ID list 256, and so on. In further embodiments, other search methods may be implemented including index searches and the like. In an alternative embodiment, when the record number of the session ID is also extracted from the cookie, session ID comparator 284 may compare the extracted session ID to the session ID having the corresponding record number only.

In many embodiments, after session ID comparator 284 compares a session ID from a cookie against session IDs in user database 254 and finds a match, time monitor 290 may update the time indication or time stamp associated with the matching session ID in user database 254. However, if the matching session ID in user database 254 is expired, the user's identity may not be verified via the session ID from the cookie and time monitor 290 may remove the matching session ID from user database 254 or invalidate the matching session ID. In further embodiments, while session ID comparator 284 compares a session ID from a cookie against session IDs in user database 254, time monitor 290 may compare time stamps associated with session IDs against the session ID from the cookie to determine whether the corresponding session IDs have expired. Any session ID determined to be expired by time monitor 290 is either removed from user database 254 or invalidated.

In further embodiments, time monitor 290 may facilitate monitoring time stamps or indications in user database 254 with an independent search from comparisons made by session ID comparator 284, in addition to or as an alterative for monitoring time stamps in conjunction with session ID comparator 284. For instance, time monitor 290 may couple with shared memory buffer 250 to periodically search for and remove expired session IDs from user database 254 such as session IDs that expired after a period of inactivity by the user, a period of time from the initial login by the user, a period of time since entering the session ID into session ID list 256, or the like.

Alternative embodiments may be designed to interface with applications like web browsers that facilitate storage of session IDs on a user's computer or terminal and the return of the session ID with communications such as a text terminal with a text interface rather than a GUI interface, a PDA with a limited text or GUI interface, or the like.

Figure 3:
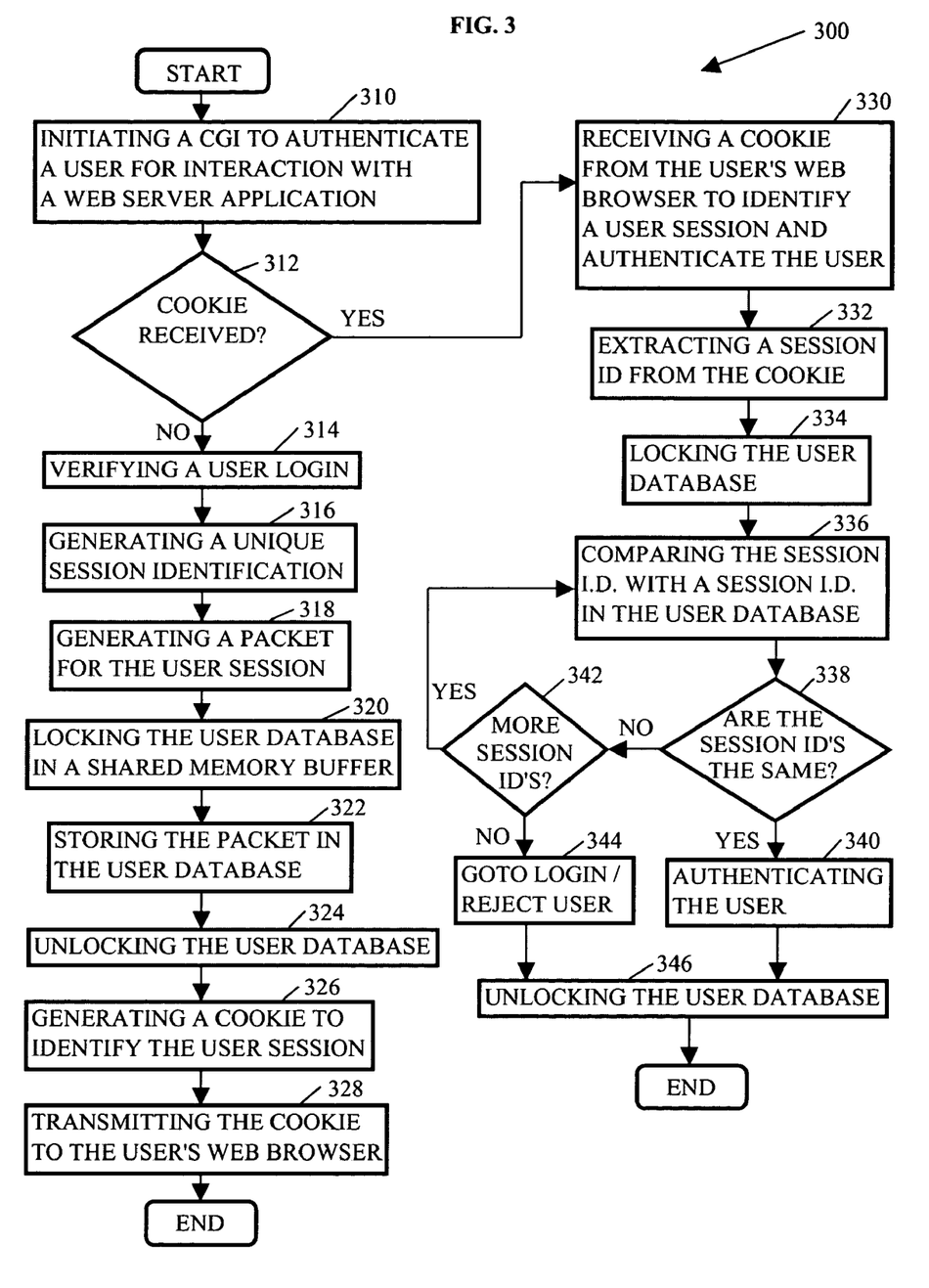
FIG. 3 depicts an example flow chart of a method to authenticate a user for interaction with applications in a server.

FIG. 3 depicts an example flow chart 300 of a method to authenticate a user for interaction with applications on a server. Flow chart 300 begins with element 310, initiating a CGI to authenticate a user for interaction with a web server application. When a cookie does not accompany the request from the web browser, a login application may request that the user provide login information such as the user's name and password. The login information is verified (element 314) with user login data on the server.

Upon verifying that the user is authorized to access the server, a unique, session ID is generated (element 316) to associate with the user's login session. The session ID may include a unique, random number such as a 512-bit, random number. In some embodiments, generating a unique, random number includes comparing the random number to other session IDs stored in the user database of a shared memory buffer to verify that the random number is unique. For example, a random number for the user's login session may be generated. Then, the user database may be locked via a semaphore to prevent other applications from simultaneously accessing the user database while the random number is compared to session IDs stored in the user database. If the random number is unique with respect to the list of session IDs in the user database, the random number is associated with the user's login session.

In element 318, a packet is generated for the unique, session ID to store in the user database. The packet may include the unique, session ID and may also include other information that describes the context of the user's login session. For example, the user may log into the server via a computer identified by an IP address. The IP address for the user's computer is associated with the session ID assigned to the user's login session such that IP addresses of subsequent transmissions from the user can be compared the IP address associated with the user's ID in the user database. In further embodiments, the packet having the session ID is encrypted to prevent or substantially attenuate unauthorized access to the session ID.

The user database is locked in element 320 to prevent simultaneous access of the user database by more than one application while the packet is stored in the user database. In other embodiments, an entry in which the packet is to be stored is locked to prevent simultaneous access to the entry.

Upon locking the user database, the packet is transmitted to the shared memory buffer for storage in the user database in element 322. The shared memory buffer retains the packet for access even after termination of the web applications and the web server currently running. In many embodiments, the shared memory buffer is allocated as an independent allocation from allocations of memory to an individual application. Thus, when the web server and/or another application is executed in response to a communication from a user, the packet may be accessed by one or more applications. Once the packet is stored, the user database is unlocked to facilitate access by other applications in element 324. For example, a flag or bit may be set to a logical one to indicate that the user database is being modified or accessed. Then, when another application attempts to access the user database while the packet is being stored, until the flag or bit is set to a logical zero.

In element 326, a cookie having the unique, session ID is generated for transmission to the user's web browser. After the cookie is forwarded to the web browser in element 328, the cookie may be returned to the server when the user attempts to initiate another application associated with the user's login session. In some embodiments, the cookie may be encrypted prior to transmission.

In element 312, when the cookie is returned to the server, the user may avoid re-entry of login information. In particular, receipt of the cookie having a session ID from the user's web browser (element 330) may identify the user's login session and authenticate the user. The session ID is extracted from the cookie (element 332) and the user database is locked (element 334) to facilitate access to the user database to compare the extracted session ID with session IDs for authenticated users. In several embodiments, extracting the session ID from the cookie may involve decrypting the session ID.

Upon determining the session ID embedded in the cookie, the session ID from the cookie is compared with a selected session ID from the user database in element 336. A session ID may be selected from the user database by, selecting the first session ID, the last session ID, a session ID substantially in the middle of the user database, a session ID corresponding to a record number or memory address also embedded in the cookie, or the like. When the session ID extracted from the cookie does not match the selected session ID (element 338) and more session IDs are stored in the user database (element 342), another session ID is selected from the user database and compared with the session ID extracted from the cookie (element 336). Once a matching session ID is found (element 338), the user is authenticated in element 340 and the user database is unlocked (element 346) to allow subsequent accesses.

On the other hand, when no session IDs in the user database are found to match the session ID extracted from the cookie (element 342), the user's request to initiate an application associated with the user's login session is rejected or the login application is initiated to authenticate the user based upon entry of login information (element 344) such as a user name and password. The user database is then unlocked (element 346) to facilitate access to the user database by other applications.

Figure 4:
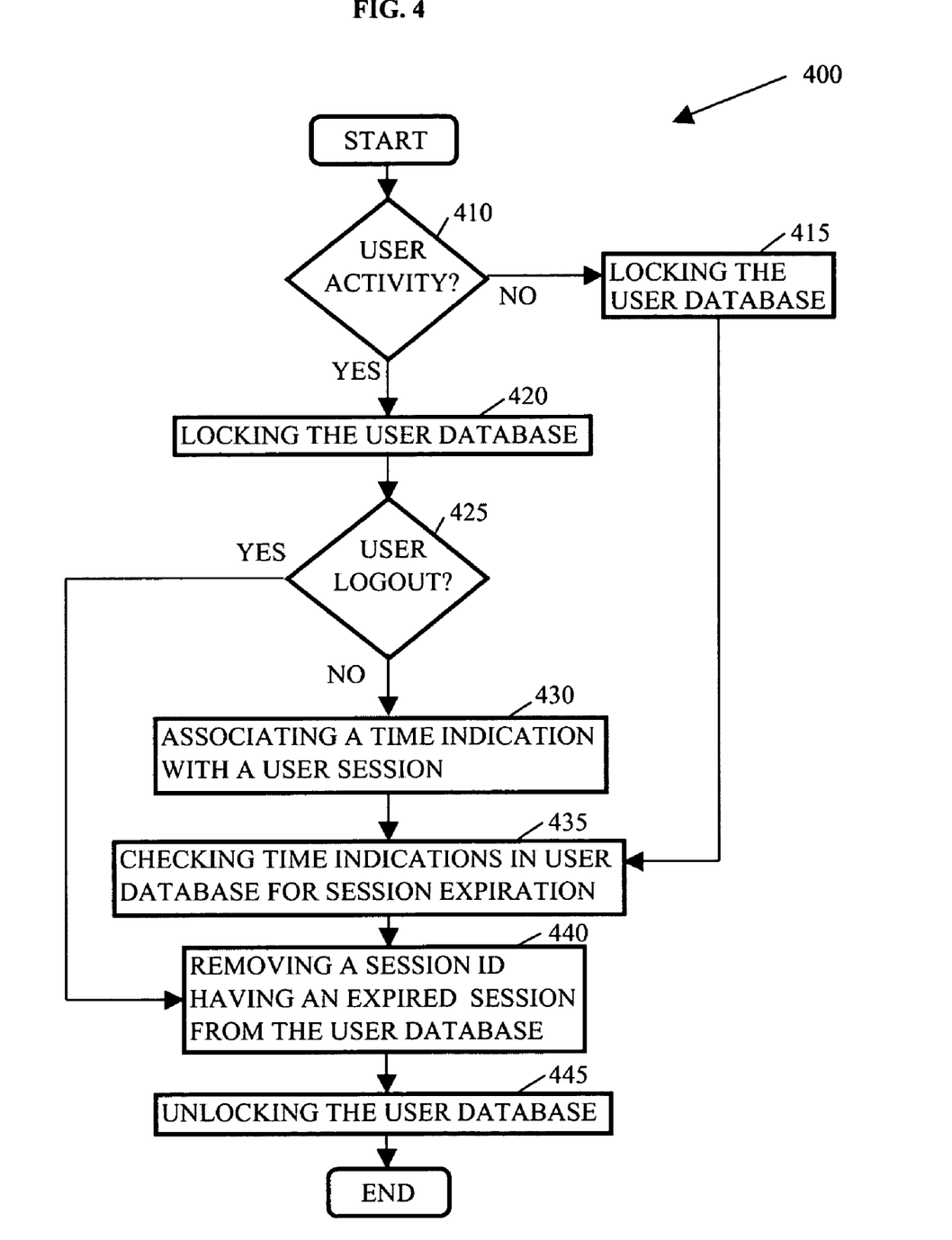
FIG. 4 depicts an example flow chart of functionality for a flow chart like the flow chart in FIG. 3 to remove user sessions upon expiration or in response to a user activity such as logging out of a session.

FIG. 4 depicts an example flow chart 400 of functionality for a method like flow chart 300 in FIG. 3 for removing user sessions upon expiration or in response to a user activity such as logging out of a session. Such functionality is advantageous since the allocation of memory to a shared memory buffer for the user database may be independent of de-allocations of memory for individual applications and the entries in the shared memory buffer may remain in the shared memory buffer indefinitely or until the operating system that made the allocation of memory for the shared memory buffer is terminated and/or the computer containing the shared memory buffer is turned off or powered down. Flow chart 400 begins with monitoring for user activity in element 410. When the user logs into the server, a user session is initiated and a time indication may be initially stored with a session ID in the user database to indicate the first user activity. After the initial login, the user's activity may be monitored or applications initiated by the user may report user activity. For example, receipt of a request from any user may initiate the elements of flow chart 400. On the other hand, applications operating on the server may periodically or at specified points of execution, initiate the elements of flow chart 400.

When user activity (element 410) has occurred and involves the user indicating a desire to logout of the server (element 425), the user database is locked, and the user's unique, session ID is removed from the user database to prevent subsequent authentication of a user based upon the unique, session ID (element 440). Then, the user database is unlocked (element 445).

When user activity (element 410) has occurred and does not involve the user indicating a desire to logout of the server (element 425), a new time indication may be stored in the user database (element 430) to indicate the time and/or date of the user activity, extending the expiration of the user's login session. While accessing the user database, time indications for other session IDs may be checked (element 435) to see if the corresponding login sessions have expired. If login sessions associated with session IDs in the user database have expired, the corresponding session IDs are removed from the user database (element 440) to prevent future access to the server based upon those session IDs. Then, the user database is unlocked in element 445.

When elements of flow chart 400 are initiated without a corresponding user activity (element 410), such as period implementation of a time monitoring CGI by the server, the user database is locked in element 415 and the user database is accessed to determine whether time indications associated with session IDs correspond to expired login sessions (element 435). When login sessions have expired, the corresponding session IDs are removed from the user database (element 440) and the user database is unlocked (element 445) to allow subsequent access by applications on the server.

One embodiment of the invention is implemented as a program product for use with a computer system such as, for example, the system 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media to authenticate a user by assigning a unique, session ID to a login session and maintaining the session ID in memory that is not de-allocated in response to the termination of an application on the server. It is understood that the form of the invention shown and described in the detailed description and the drawings are to be taken merely as examples. It is intended that the following claims be interpreted broadly to embrace all the variations of the example embodiments disclosed.

What is claimed is:

1. A method for logging a successful authentication of a user, the method comprising:

generating, by an embedded system, a session identification in response to the authentication to identify a login session for the user;

allocating, by the embedded system, application independent memory to create a memory location of the embedded system for shared access by more than one applications of the embedded system;

arbitrating the shared access to at least a portion of the memory location of the embedded system by checking a semaphore in the memory location to determine whether an application is currently accessing the at least a portion of the memory location and, if not, granting access to the at least a portion of the memory location by storing an in-use indication in the semaphore, the in-use indication comprising the session identification, the memory location being configured to retain the session identification independent of de-allocations of memory for the more than one applications, to authenticate the user for the login session; and by releasing the at least a portion of the memory location for access by other applications by resetting the in-use indication in the semaphore; and transmitting the session identification from the embedded system to a computer from which the user accessed the embedded system.

2. The method of claim 1, further comprising storing additional session information with the session identification to associate the additional session information with the login session.

3. The method of claim 1, further comprising:

associating a time indication with the session identification and removing the session identification from the memory location after a period of inactivity by the user.

4. The method of claim 1, further comprising locking the memory location while accessing an entry for the session identification in the memory location.

5. The method of claim 1, wherein generating a session identification comprises generating a random number, the random number uniquely identifying the user's login session.

6. The method of claim 1, wherein storing the session identification comprises storing the session identification in a shared memory buffer.

7. The method of claim 1, wherein transmitting the session identification comprises generating a cookie and transmitting the cookie to a web browser utilized by the user.

8. The method of claim 1, further comprising authenticating the login session for the user in response to receipt of the session identification associated with the user with a request, wherein authenticating the user comprises comparing the session identification with session identifications previously stored in the memory location.

9. An apparatus of an embedded system for logging a successful authentication of a user for the embedded system, the apparatus comprising:

a memory location of the embedded system to retain a session identification independent of de-allocation of memory for more than one applications executed on the embedded system;

an arbitrator to facilitate shared access to the memory location by the more than one applications executed on the embedded system and to prevent simultaneous access to the memory location by more than one of the applications executed on the embedded system by checking a semaphore in the memory location to determine whether an application is currently accessing the memory location and, if not, granting access to at least a portion of the memory location by storing an in-use indication in the semaphore and by releasing the at least a portion of the memory location for access by other of the more than one applications by resetting the in-use indication in the semaphore;

a session creator coupled with the memory location to generate the session identification in response to the authentication to identify a login session of the user, store the session identification in the memory location in response to the granting access to the at least a portion of the memory location by the arbitrator, and transmit the session identification to the user's computer; and a session authenticator coupled with the memory location to authenticate the user for an application of the individual applications executed on the server in response to receipt of the session identification upon verifying that the session identification is stored in the memory location.

10. The apparatus of claim 9, wherein the arbitrator locks at least one entry in the memory location while accessing the at least one entry for the session identification in the memory location and unlocks the at least one entry of the memory location in response to completion of access of the at least one entry of the memory location.

11. The apparatus of claim 9, wherein the memory location comprises at least a portion of a shared memory buffer.

12. The apparatus of claim 9, wherein the session creator comprises a session identification generator to generate a unique, random number to associate with the user and the login session.

13. The apparatus of claim 9, wherein the session creator comprises a bundle generator to bundle the session identification with additional session information, associating the additional session information with the login session.

14. The apparatus of claim 13, wherein the bundle generator comprises a time stamper to associate a time indication with the session identification and the session authenticator comprises a time monitor coupled with the memory location to remove the session identification from the memory location after a period of inactivity by the user.

15. The apparatus of claim 9, wherein the session creator comprises a bundle transmitter to transmit a bundle having the session identification to a web browser, wherein the web browser is utilized by the user to communicate with the embedded system.

16. The apparatus of claim 9, wherein the session authenticator comprises an identification comparator to compare the session identification received from the user with session identifications previously stored in the memory location.

17. A computer program product for logging successful authentication of a user for an embedded system, the computer program product comprising:

a computer usable storage medium having computer usable program code embodied therewith, the computer usable program code comprising:

computer usable program code configured to perform operations, comprising:

generating, by an embedded system, a session identification in response to the authentication to identify a login session for the user;

allocating, by the embedded system, application independent memory to create a memory location of the embedded system for shared access by more than one applications of the embedded system;

arbitrating the shared access to at least a portion of the memory location of the embedded system by checking a semaphore in the memory location to determine whether an application is currently accessing the at least a portion of the memory location and, if not, granting access to the at least a portion of the memory location by storing an in-use indication in the semaphore, the in-use indication comprising the session identification, the memory location being configured to retain the session identification independent of de-allocations of memory for the more than one applications, to authenticate the user for the login session; and by releasing the at least a portion of the memory location for access by other applications by resetting the in-use indication in the semaphore; and transmitting the session identification from the embedded system to a computer-from which the user accessed the embedded system.

18. The computer program product of claim 17, wherein the operations further comprise arbitrating access to the memory location to grant access to prevent simultaneous access by more than one of the applications.

19. The computer program product of claim 17, wherein the operations further comprise associating a time indication with the session identification to facilitate removal of the session identification from the memory location upon expiration of the login session.

20. The computer program product of claim 17, wherein the operations further comprise locking the memory location while accessing the memory location.

21. The computer program product of claim 17, wherein generating a session identification comprises generating a unique, random number to associate with the user and the login session.

22. The computer program product of claim 17, wherein authenticating the user comprises receiving the session identification from the user and comparing the session identification with session identifications in the memory location.

* * * * *